Jan. 30, 1923.

H. J. EBERHARDT.
SINUSOIDAL GEARING.
FILED JAN. 10, 1920.

1,443,837

HENRY J. EBERHARDT, INVENTOR

BY
ATTORNEY

Patented Jan. 30, 1923.

1,443,837

UNITED STATES PATENT OFFICE.

HENRY J. EBERHARDT, OF NEWARK, NEW JERSEY, ASSIGNOR TO NEWARK GEAR CUTTING MACHINE CO., OF NEWARK, NEW JERSEY, A CORPORATION OF NEW JERSEY.

SINUSOIDAL GEARING.

Application filed January 10, 1920. Serial No. 350,614.

*To all whom it may concern:*

Be it known that I, HENRY J. EBERHARDT, a citizen of the United States, and a resident of Newark, in the county of Essex and State of New Jersey, have invented certain new and useful Improvements in Sinusoidal Gearing, of which the following is a specification.

The invention relates to helical type gearing, either single or double, and operative about axes substantially parallel to each other. Heretofore, various angles have been given the teeth of helical gearing to afford continuity of tooth contact between a pair of gears on their pitch cylinders. The greater the angle used, the greater are the end thrusts and the longer is the time required for the cutting of the teeth; also, there results a greater deviation from standard spur gear proportions.

By means of the novel tooth construction forming the subject of the present invention, I am enabled to provide a gear which can be readily cut, for example by the process set forth in my co-pending application, Serial No. 348,958 filed the 2nd day of January 1920, and which provides greater strength of tooth for a given angularity and allows also for greater continuity of pitch line tooth contact for a given average angularity. The novel tooth which I term "sinusoidal" is of a continuously varying angularity upon both sides of the axis of the gear and approximates in contour that of a true helix, being, however, of greater angularily in relation to the axis at opposite sides of the tooth center. The novel gear has teeth of greater continuity of pitch line tooth contact for a given average angularity, is more quickly and more easily cut, and its construction, moreover, is conductive to a more quiet gear operation at high speeds, for the decreasing and again increasing angularity of the sinusoidal teeth tends to destroy the noisy vibration which is frequently set up with regularly formed teeth. Absence of such vibration, tends to make the improved gears especially valuable in airplane, automotive and other high speed transmissions. While the teeth are herein shown and described as constructed on cylindrical pitch surfaces, it is obvious that the same may be applied to an elliptical surface and also that they may be employed as rack teeth, a rack of this character being a sinusoidal gear wheel of infinite radius.

The accompanying drawings illustrate diagrammatically the novel teeth as variously constructed on cylindrical pitch surfaces; and in these drawings, Fig. 1 is a top view illustrating the outlines of teeth embodying my invention and as applied to a single wheel.

The teeth and the various wheels shown may be cut by hobs, endmills, planing tools or other means and preferably by the method more particularly set forth in my aforesaid co-pending application; and the character of the teeth cut may be of any well-known type such as involute, or cycloidal.

Figure 1:
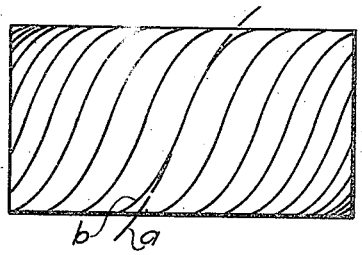

Referring more particularly to Fig. 1 of the drawings, the tooth outline of a true helical tooth is indicated by the broken line ($a$) which represents a tooth having a uniform lead and angle of twist substantially as heretofore constructed. The novel tooth is represented in outline substantially by the full lines ($b$) which represent sinusoids of decreasing lead and increasing angle, the departure from the helix ($a$) being diagrammatically indicated by the space between the two lines ($a$) and ($b$). It will be noted that the novel tooth has a continuously varying angularity upon opposite sides of the axis of the wheel, the angularity first decreasing and then increasing as the tooth goes into action.

Figure 2:
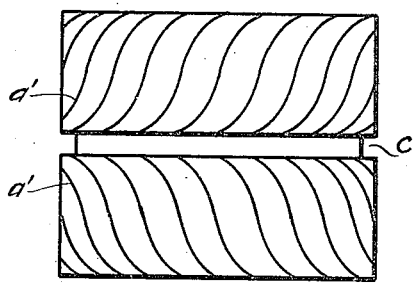
Fig. 2 is a similar view illustrating the invention as applied to a double herringbone gear wheel, provided with a groove for cutting-tool clearance.
Figure 3:
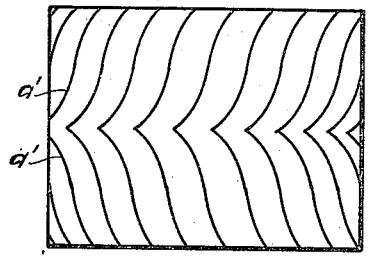
Fig. 3 is a similar view of a double herringbone gear wheel with clearance groove omitted.

When applied to gear wheels of the herringbone type, a plurality, for example two sets of sinusodial teeth ($a'$) may be arranged as indicated in Fig. 2; and, if desired, a clearance groove ($c$) may be provided between the same for the cutting chips made by any preferred type of tool.

Or, the groove ($c$) may be entirely omitted and a double wheel formed with the two sets of teeth ($a'$) adjoining. This latter type of herringbone gear with groove omitted, provides for greater strength and compactness and is especially suited to be cut with endmills or reciprocating planing tools.

I claim:—

1. A gear wheel, comprising a pitch surface parallel to its axis and sinusodial teeth thereon.

2. A gear wheel, comprising a pitch cylinder and sinusoidal teeth thereon.

3. A gear wheel, comprising a pitch surface parallel to its axis and helically directed teeth thereon of continuously varying angularity upon opposite sides of the axis.

4. A gear wheel, comprising a pitch surface parallel to its axis and helically directed teeth thereon, the angularity decreasing and again increasing as the teeth go into action.

5. A gear wheel, comprising a pitch surface parallel to its axis and a plurality of sets of oppositely directed sinusoidal teeth thereon.

6. A gear wheel, comprising a pitch cylinder and two sets of oppositely directed sinusoidal teeth thereon, the teeth of one set meeting substantially the spaces of the adjoining set at their common apex.

Signed at Newark in the county of Essex and State of New Jersey this 8th day of January A. D. 1920.

HENRY J. EBERHARDT.